(12) United States Patent  
Boland et al.

(10) Patent No.: US 8,276,239 B2
(45) Date of Patent: Oct. 2, 2012

(54) WINDSCREEN WIPER DEVICE

(75) Inventors: Xavier Boland, Arlon (BE); Pierre Henin, Bellefontaine (BE)

(73) Assignee: Federal-Mogul S.A., Aubange (BE)

( * ) Notice: Subject to any disclaimer, the term of this patent is extended or adjusted under 35 U.S.C. 154(b) by 1263 days.

(21) Appl. No.: 10/570,729

(22) PCT Filed: Aug. 25, 2004

(86) PCT No.: PCT/EP2004/051899
§ 371 (c)(1),
(2), (4) Date: Jan. 16, 2007

(87) PCT Pub. No.: WO2005/023612
PCT Pub. Date: Mar. 17, 2005

(65) Prior Publication Data
US 2007/0113367 A1 May 24, 2007

(30) Foreign Application Priority Data

Sep. 5, 2003 (EP) .................... 03103306

(51) Int. Cl.
*B60S 1/38* (2006.01)
(52) U.S. Cl. .......... 15/250.201; 15/250.43; 15/250.001; 29/428
(58) Field of Classification Search ............. 15/250.361, 15/250.48, 250.43, 250.201, 250.44, 250.32, 15/250.001; 29/428
See application file for complete search history.

(56) References Cited

U.S. PATENT DOCUMENTS

| | | | |
|---|---|---|---|
| 5,713,099 A | 2/1998 | Maubray | |
| 6,523,218 B1 * | 2/2003 | Kotlarski | 15/250.201 |
| 7,484,264 B2 * | 2/2009 | Kraemer et al. | 15/250.201 |
| 7,581,277 B2 * | 9/2009 | Genet et al. | 15/250.201 |
| 2003/0159229 A1 | 8/2003 | Dietrich et al. | |

FOREIGN PATENT DOCUMENTS

| | | |
|---|---|---|
| DE | 198 56 300 | 6/2000 |
| DE | 100 38 993 | 3/2002 |
| EP | 1 243 489 | 9/2002 |
| FR | 2 781 740 | 2/2000 |
| FR | 2 783 785 | 3/2000 |
| FR | 2 804 922 | 8/2001 |
| GB | 2 106 775 | 4/1983 |
| GB | 2346318 | * 8/2000 |
| WO | 02/087935 | * 11/2002 |
| WO | 02/090155 | * 11/2002 |

* cited by examiner

*Primary Examiner* — Gary Graham
(74) *Attorney, Agent, or Firm* — Robert Stearns; Dickinson Wright, PLLC

(57) ABSTRACT

A windscreen wiper device comprising an elastic, elongated carrier element, as well as an elongated wiper blade (2) of a flexible material, which can be placed in abutment with a windscreen to be wiped, which wiper blade (2) includes opposing longitudinal grooves (3) on its longitudinal sides, in which grooves spaced-apart longitudinal strips (4) of the carrier element are disposed, wherein neighbouring ends (5) of said longitudinal strips (4) are interconnected by a respective connecting piece (6), which windscreen wiper device comprises a connecting device (7) for an oscillating arm (8), as well as a spoiler (11) detachably connected to the wiper blade (2), with the special feature that said spoiler (11) comprises a less-flexible profile (13) which is slidably mounted on a mounting portion of the wiper blade (12).

9 Claims, 4 Drawing Sheets

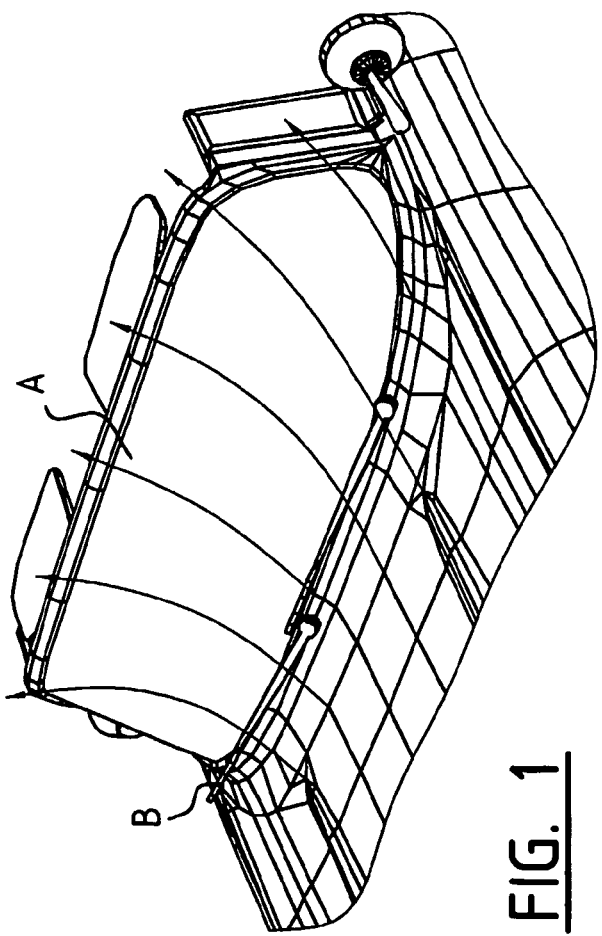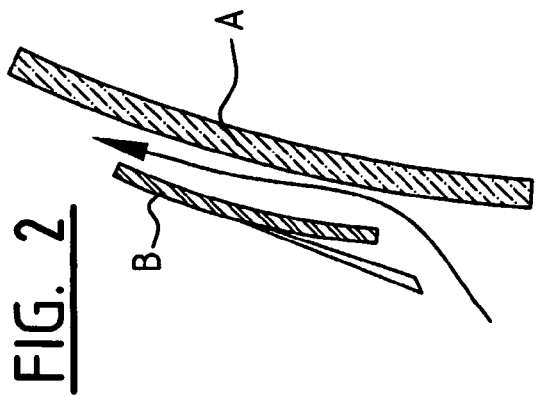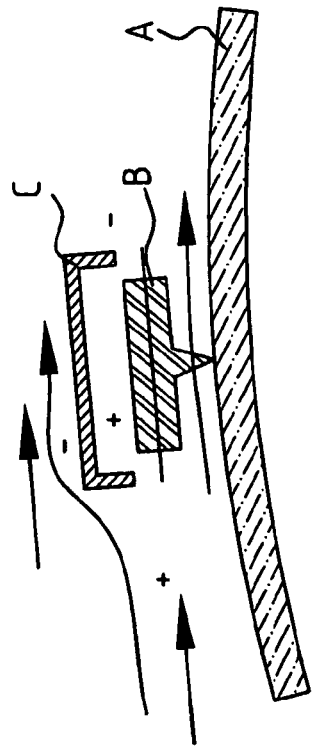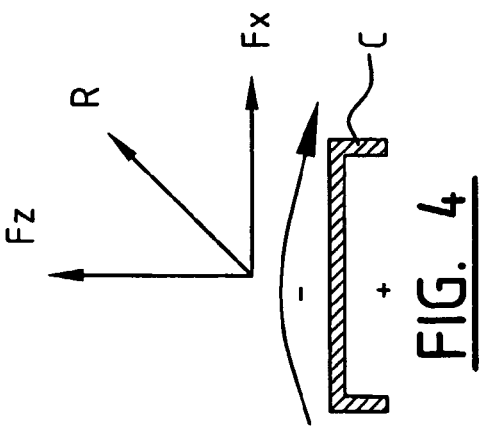

WINDSCREEN WIPER DEVICE

CROSS-REFERENCE TO RELATED APPLICATIONS

This application claims priority to PCT/EP2004/051899 filed Aug. 25, 2004, which claims priority to EP patent application 03103306.1 filed on Sep. 5, 2003, all of which are incorporated herein by reference in their entirety.

BACKGROUND OF THE INVENTION

1. Field of the Invention

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper device comprises a connecting device for an oscillating arm, as well as a spoiler detachably connected to the wiper blade. Such a spoiler is also called an "air deflector".

2. Related Art

Such a windscreen wiper device is known from international (PCT-) patent publication no. WO 02/090155 in the name of the same Applicant. The prior art windscreen wiper device is in particular designed as a "yokeless" wiper device, wherein use is no longer made of several yokes pivotally connected to each other, but wherein the wiper blade is biased by the carrier element, as a result of which it exhibits a specific curvature. In this known windscreen wiper device the spoiler includes two subspoilers being entirely detachably connected to the wiper blade on opposite sides of the connecting device, wherein the subspoilers engage around longitudinal edges of the strips that face away from each other, or—in the alternative—around longitudinal laterally extending edges of the wiper blade that face away from each other (see FIGS. 5 and 6 thereof, respectively).

SUMMARY OF THE INVENTION

It is an object of the invention to provide an alternative for a windscreen wiper device known from the above international (PCT-) patent publication, wherein the spoiler is firmly retained on the wiper blade during operation, although being detachably connected thereto.

In order to accomplish that objective, a windscreen wiper device of the kind referred to in the introduction according to the invention is characterized in that said spoiler comprises a less-flexible profile which is slidably mounted on a mounting portion of the wiper blade. In other words, said profile is made of a material being less flexible than the material of the remaining part of said spoiler. Preferably, the mounting portion is defined by a restricted neck between longitudinal slots at opposite sides of the mounting portion, and by an enlarged head above the slots, wherein the less-flexible profile—seen in cross-section—extends from one slot, along said enlarged head, to the other slot. By sliding the spoiler over the mounting portion of the wiper blade, particularly over the enlarged head thereof, the less-flexible (i.e. "hard") profile is adjacent to the mounting portion of the wiper blade during operation, so that a reliable retention of the spoiler onto the wiper blade is realized under all kinds of circumstances. Please note that the present invention allows a relative movement between the wiper blade, the strips of the carrier element and the spoiler, so that hysteresis of the wiping movement is decreased. Said less-flexible profile is particularly a non-flexible profile.

In one preferred embodiment of a windscreen wiper device in accordance with the invention the less-flexible profile extends in longitudinal direction along the length of said spoiler. Preferably, the less-flexible profile includes a groove in order to receive the mounting part of the wiper blade therein.

In another preferred embodiment of a windscreen wiper device according to the invention the less-flexible profile is connected to a flexible part of said spoiler facing away from said mounting portion of said spoiler. Said flexible part together with the wiper blade is able to follow changes in curvature of a windscreen to be wiped.

In another preferred embodiment of a windscreen wiper device in accordance with the invention the less-flexible profile and the flexible part of said spoiler are mutually connected through co-extrusion.

In another preferred embodiment of a windscreen wiper device according to the invention the less-flexible profile has a thickness varying between 0.2 mm and 1.2 mm. Preferably, the less-flexible profile is made of an elastomeric material, particularly with a low friction coefficient.

The invention also refers to a spoiler to be used in a windscreen wiper device in accordance with the invention.

The invention also relates to a method for manufacturing a windscreen wiper device according to the invention, wherein opposing longitudinal grooves are formed in longitudinal sides of an elongated wiper blade of a flexible material, which can be placed in abutment with a windscreen to be wiped, in which grooves longitudinal strips of a carrier element are subsequently fitted in spaced-apart relationship, wherein neighboring ends of said longitudinal strips are interconnected by a respective connecting piece, wherein a spoiler is detachably fitted onto the wiper blade, characterized in that said spoiler comprises a less-flexible profile which is slidably mounted on a mounting portion of the wiper blade.

BRIEF DESCRIPTION OF THE DRAWINGS

The invention will now be explained in more detail with reference to figures illustrated in a drawing, wherein:

FIG. 1 shows diagrammatically the flow of streams of air along the windscreen of a car;

FIG. 2 is a diagram of a standard windscreen wiper device in a position parallel to the streams of air;

FIG. 3 is a cross-section of the same windscreen wiper device, but in a position at right angles to the streams of air;

FIG. 4 illustrates the forces due to the tangential streams of air acting on the standard windscreen wiper device;

DETAILED DESCRIPTION OF THE PREFERRED EMBODIMENT

FIG. 1 shows a perspective view of the front portion of a car provided with a curved windscreen A, together with the direction of flow of the streams of air, the latter passing the vehicle upwards and along the sides. In a zone in which a windscreen wiper device of the usual standard form is positioned parallel to the streams of air, as shown in FIG. 2, nothing unusual occurs; on the other hand, in a zone as shown in FIG. 3, in which the streams of air flow practically at right angles to the direction of the windscreen wiper device, this air cannot flow along the glass because of the wiper blade, and thus creates an increase in pressure (indicated by the + sign). Such an increased pressure also exists in the region of the hollow profile comprised between the flanges of the frame C directed towards the windscreen. These flanges create further obstacles to the flow of air and assist in maintaining the increased pressure. In addition, the streams of air which pass round the windscreen wiper device towards the upstream side tend to move away from the surface and create a reduced pressure zone (indicated by the − sign), as is well known. These two forces Fx and Fz (which can be compared with the drag and the lift acting on a wing section) have a resultant R which tends to lift the windscreen wiper device against the mechanical pressure applied by the arm (see FIG. 4).

Figure 5:
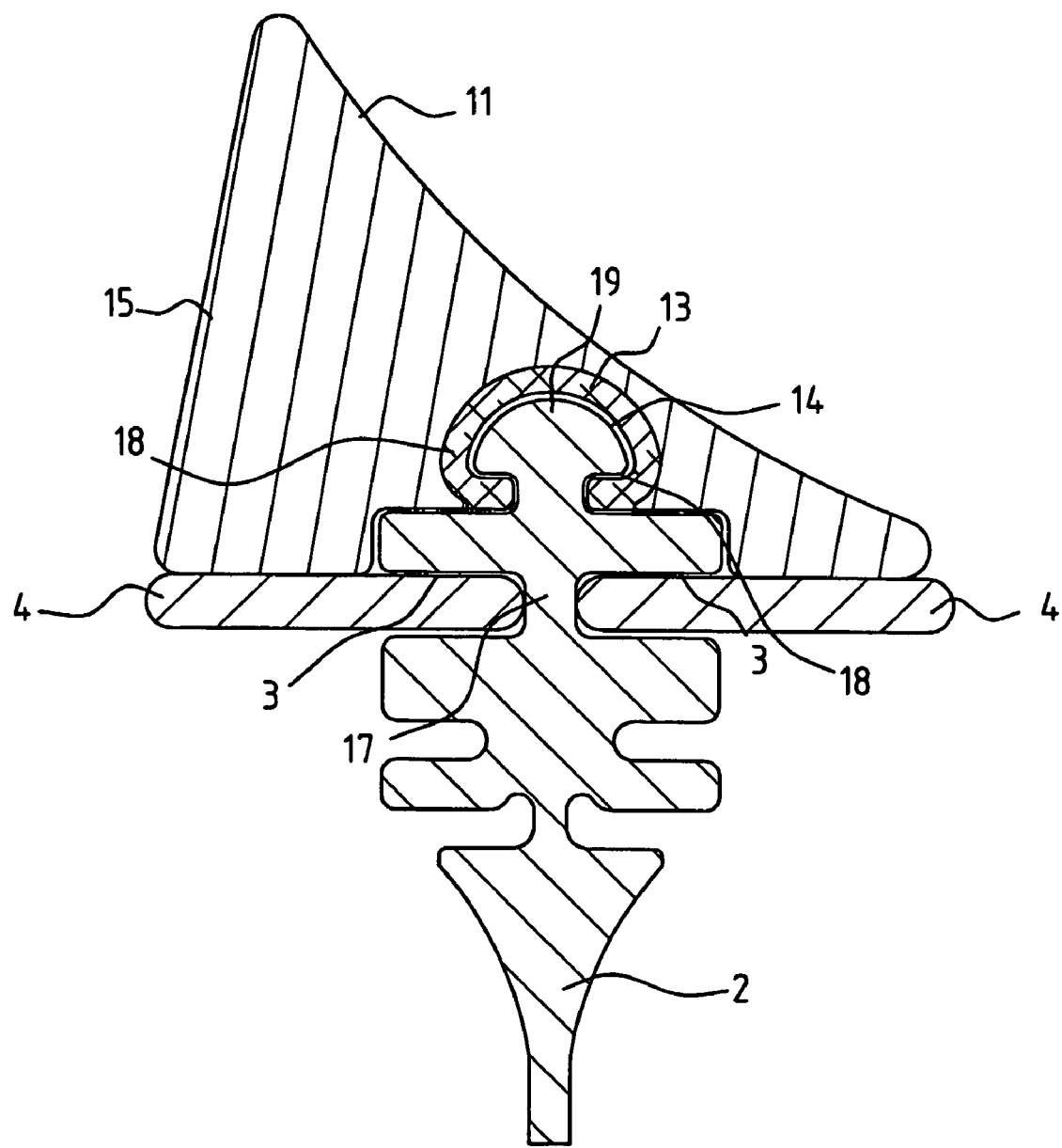
FIGS. 5 and 6 show a cross-sectional and a perspective view, respectively, of a windscreen wiper device according to a preferred embodiment of the invention.
Figure 6:
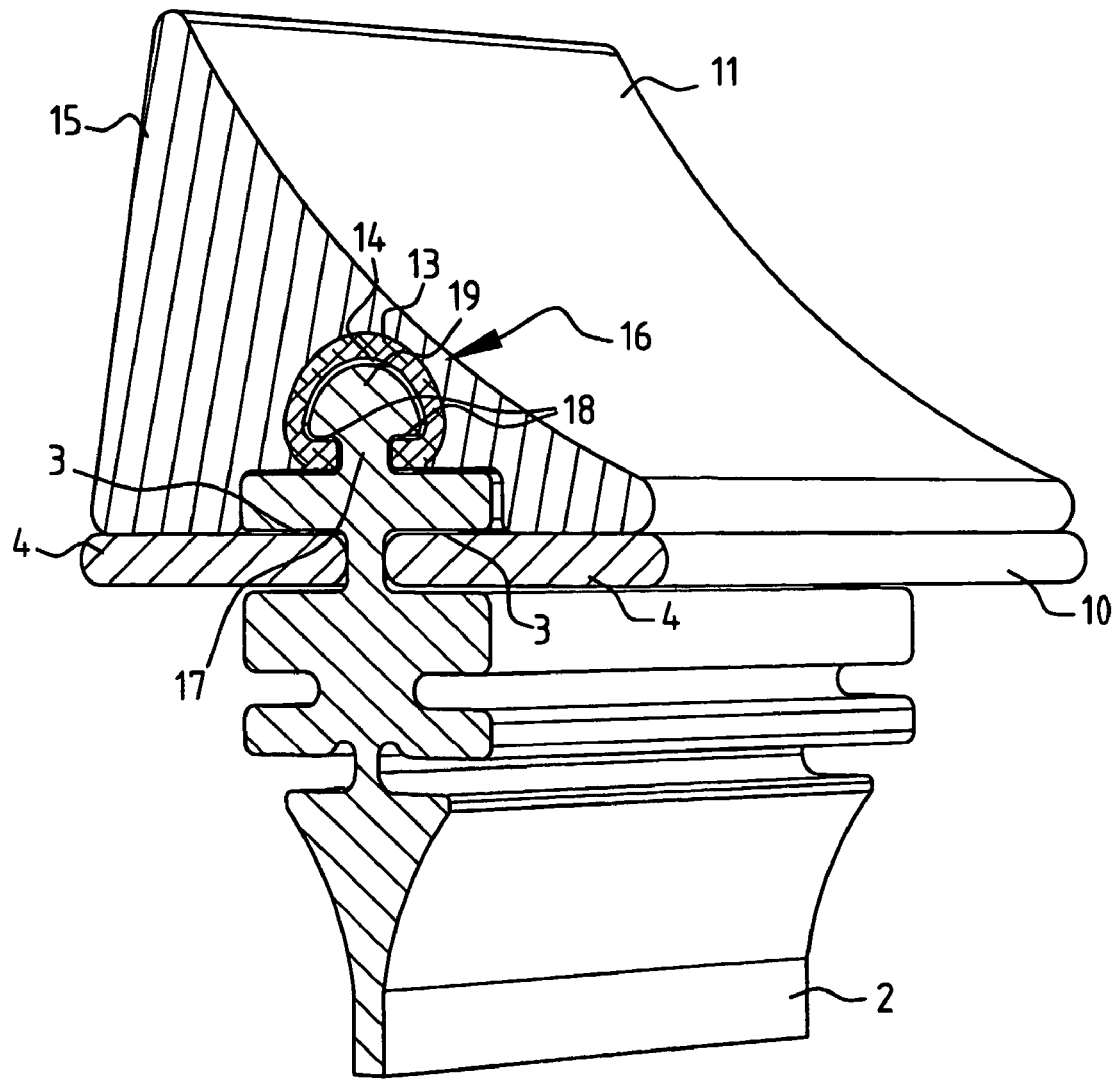

FIGS. 5 and 6 show a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of connecting pieces 6 functioning as clamping members. In this embodiment, the connecting pieces 6 are separate constructional elements, which may be form-locked as well as force-locked to the ends 5 of strips 4. In another preferred variant, said connecting pieces 6 are in one piece with the strips 4 made of spring band steel. In the latter case said connecting pieces form transverse bridges for the strips 4, as it were.

The windscreen wiper device 1 is furthermore built up of a connecting device 7 of plastic material for an oscillating wiper arm 8. Connecting device 7 comprises clamping members 9 that are integral therewith, which engage round longitudinal sides 10 of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end.

The preferred embodiment of FIGS. 5 and 6 according to the invention comprises a spoiler 11 including two separate sub-spoilers 12. Each sub-spoiler 12 is detachably connected in its entirety to the wiper blade 2 on opposite sides of the connecting device 7. Each sub-spoiler 12 includes a less-flexible profile 13 having a C-shaped cross-section so as to form a groove 14 extending in longitudinal direction along the entire length of the sub-spoiler 12. The profile 13 is made of a hard elastomeric material and is connected to a more flexible part 15 of the sub-spoiler 12 through co-extrusion, while said flexible part 15 is made of a flexible elastomeric material, such as rubber.

The wiper blade 2 has a mounting portion 16 defined by a restricted neck 17 between longitudinal slots 18 at opposite sides of the mounting portion 16, and by an enlarged head 19 above the slots 18. The less-flexible profile 13—seen in cross-section—extends from one slot 18, along/over said enlarged head 19, to the other slot 18. By sliding the sub-spoilers 12 over the mounting portion 16 of the wiper blade 2, particularly over the enlarged head 19 thereof, said enlarged head 19 is disposed in the groove 14 of the less-flexible (i.e. "hard") profile 13 along its entire length. Accordingly, a reliable retention of the spoiler 11 onto the wiper blade 2 is realized under all kinds of circumstances. Simultaneously, flexible part 15 together with the wiper blade 2 is able to follow changes in curvature of a windscreen to be wiped. The wiper blade 2 is made in one piece.

Figure 7:
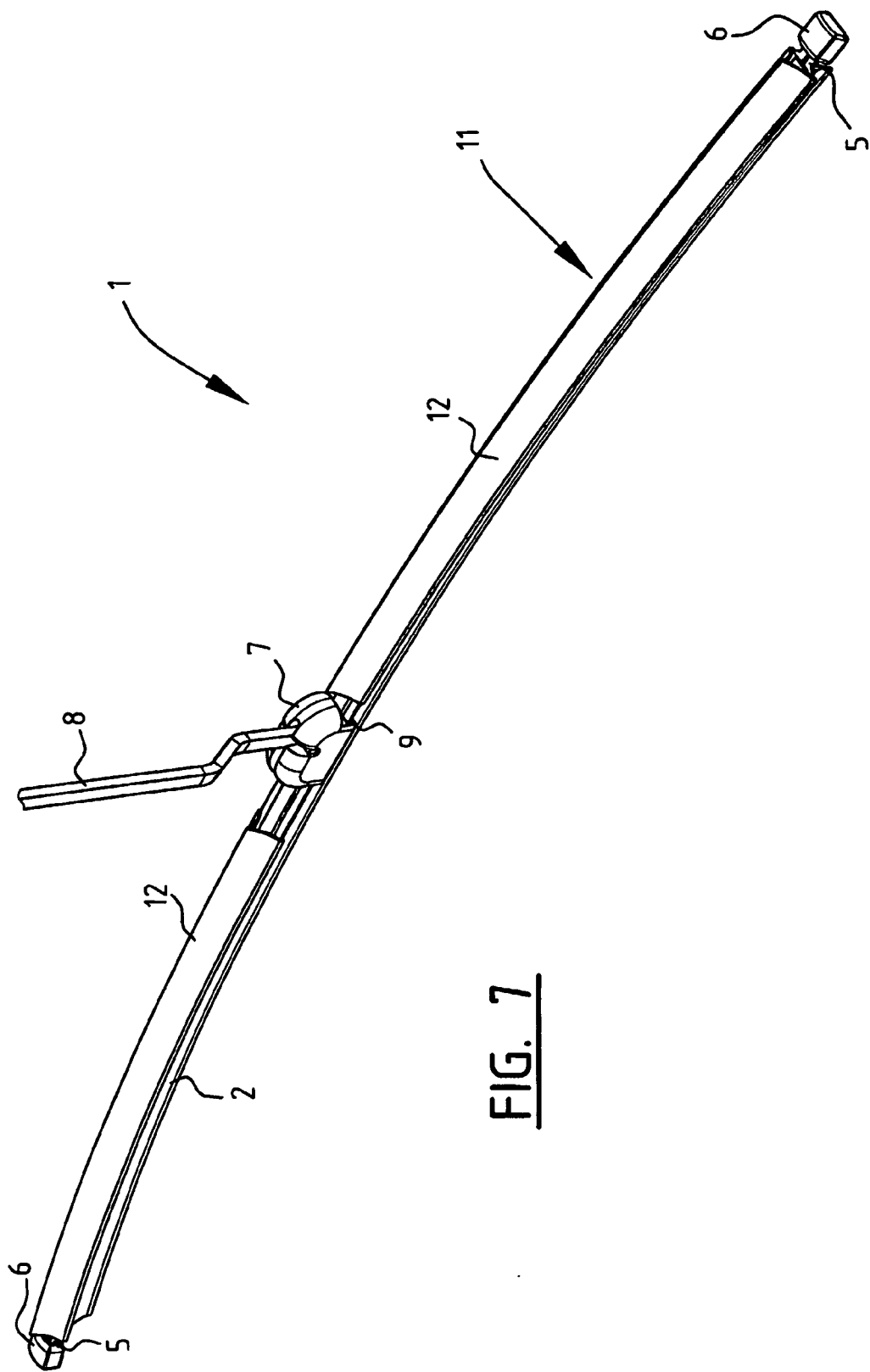
FIG. 7 is a total perspective, schematic view of the windscreen wiper device of FIGS. 5 and 6.

FIG. 7 shows a total perspective, schematic view of the windscreen wiper device of FIGS. 5 and 6, wherein corresponding parts have been designated with the same reference numerals.

The invention is not restricted to the variants as shown in the drawing, but it also extends to other embodiments that fall within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighborring ends of said longitudinal strips are interconnected by a respective connecting piece, said wiper blade further including opposing slots above said grooves providing a restricted neck of said wiper blade and an enlarged head above said slots, which windscreen wiper device comprises a connecting device for an oscillating arm, as well as a spoiler detachably connected to the wiper blade, said spoiler comprising a longitudinally extending flexible part and a relatively less-flexible profile extending lengthwise between opposite ends, said relatively less-flexible profile is slidably mounted on a mounting portion of the wiper blade defined by the enlarged head and slots of the wiper blade and the flexible part engages the longitudinal strips of the carrier, and wherein the relatively less-flexible profile is connected to the flexible part of said spoiler through co-extrusion.

2. A windscreen wiper device according to claim 1, wherein the relatively less-flexible profile extends the length of said spoiler.

3. A windscreen wiper device according to claim 1, wherein the relatively less-flexible profile has a thickness varying between 0.2 mm and 1.2 mm.

4. A windscreen wiper device claim 1, wherein the relatively less-flexible profile is made of a thermoplastic elastomer.

5. A method for manufacturing a windscreen wiper device, comprising the steps of:

forming opposing longitudinal grooves in longitudinal sides of an elongated wiper blade of a flexible material, which can be placed in abutment with a windscreen to be wiped, the wiper blade including a restricted neck portion and an enlarged mounting head portion both projecting above the location of the grooves;

fitting longitudinal strips of a carrier element in the longitudinal grooves in a spaced-apart relationship, wherein neighboring ends of said longitudinal strips are interconnected by a respective connecting piece; and detachably fitting a spoiler onto the wiper blade, said spoiler having a longitudinally extending C-shaped cross-sectional profile portion of a first flexible material and a portion of a relatively less flexible second material different than that of the first material and which C-shaped cross-sectional profile is slidably mounted on and directly engaging the restricted neck and enlarged head portions of the wiper blade and the flexible part is engaging the longitudinal strips of the carrier.

6. A windscreen wiper device, comprising:

an elastic elongated carrier element having spaced-apart longitudinal strips with neighboring ends;

an elongated flexible wiper blade having opposing longitudinal grooves on opposing longitudinal sides and a mounting portion on an upper surface of said wiper blade above said grooves in the form of a restricted neck and an enlarged head portion of the said wiper blade;

a connecting device interconnecting the neighboring ends of said carrier element; and a co-extruded spoiler having a longitudinally extending flexible part of a first material and a C-shaped cross-sectional profile part of a relatively less-flexible second material different than that of the first material, and wherein the C-shaped cross-sectional profile part is slidably mounted on and directly engaging said neck and head portions of the wiper blade and the flexible part engages the longitudinal strips of the carrier.

7. A windscreen wiper device according to claim 6, wherein the relatively less-flexible profile extends the length of said spoiler.

8. A windscreen wiper device according to claim 6, wherein the relatively less-flexible profile has a thickness varying between 0.2 mm and 1.2 mm.

9. A windscreen wiper device claim 6, wherein the relatively less-flexible profile is made of a thermoplastic elastomer.

* * * * *